(12) United States Patent
Balentine et al.

(10) Patent No.: US 7,573,986 B2
(45) Date of Patent: Aug. 11, 2009

(54) METHOD AND SYSTEM FOR INTERJECTING COMMENTS TO IMPROVE INFORMATION PRESENTATION IN SPOKEN USER INTERFACES

(75) Inventors: Bruce Balentine, Denton, TX (US); Rex Stringham, Danville, CA (US); Justin Munroe, Denton, TX (US)

(73) Assignee: Enterprise Integration Group, Inc., San Ramon, CA (US)

( * ) Notice: Subject to any disclaimer, the term of this patent is extended or adjusted under 35 U.S.C. 154(b) by 220 days.

(21) Appl. No.: 09/908,377

(22) Filed: Jul. 18, 2001

(65) Prior Publication Data

US 2003/0016793 A1    Jan. 23, 2003

(51) Int. Cl.
*H04M 1/64* (2006.01)
(52) U.S. Cl. .................... 379/76; 704/275
(58) Field of Classification Search .......... 379/88.16, 379/201, 68, 72, 76; 704/257, 270, 275, 704/255
See application file for complete search history.

(56) References Cited

U.S. PATENT DOCUMENTS

| | | | | |
|---|---|---|---|---|
| 5,652,789 A * | 7/1997 | Miner et al. | ........... | 379/201.01 |
| 5,948,059 A * | 9/1999 | Woo et al. | ........... | 709/206 |
| 6,058,166 A * | 5/2000 | Osder et al. | ........... | 379/88.22 |
| 6,094,476 A * | 7/2000 | Hunt et al. | ........... | 379/88.04 |
| 6,111,937 A * | 8/2000 | Kuroiwa et al. | ........... | 379/263 |
| 6,173,266 B1 * | 1/2001 | Marx et al. | ........... | 704/270 |
| 6,246,981 B1 * | 6/2001 | Papineni et al. | ........... | 704/235 |
| 6,334,103 B1 * | 12/2001 | Surace et al. | ........... | 704/257 |
| 6,370,238 B1 * | 4/2002 | Sansone et al. | ........... | 379/71 |
| 6,421,672 B1 * | 7/2002 | McAllister et al. | ........... | 707/10 |
| 6,845,356 B1 * | 1/2005 | Epstein | ........... | 704/235 |
| 2001/0047263 A1 * | 11/2001 | Smith et al. | ........... | 379/201.01 |
| 2002/0091530 A1 * | 7/2002 | Panttaja | ........... | 704/275 |
| 2002/0147593 A1 * | 10/2002 | Lewis et al. | ........... | 704/275 |
| 2003/0206622 A1 * | 11/2003 | Foster | ........... | 379/265.09 |

OTHER PUBLICATIONS

Hearst, Marti A.; "Mixed-initiative Interaction"; *IEEE Intelligent Systems*; Sep./Oct. 1999; pp. 14-23.
Nickson, Mark; "Natural Language Meets IVR"; *Speech Technology Magazine*; Apr./May 1998; printed from Internet at www.speechtechmag.com Dec. 26, 2002.
Bruce Balentine et al., How to Build a Speech Recognition Application, Book, Apr. 1999, pp. 1-335, First Edition, Enterprise Integration Group, Inc., San Ramon, California, USA.
Bruce Balentine et al., How to Build a Speech Recognition Application, Book, Dec. 2001, pp. 1-413, Second Edition, Enterprise Integration Group, Inc., San Ramon, California, USA.
Marti A. Hearst, Mixed-Initiative Interaction, Journal, Sep./Oct. 1999, pp. 14-23, IEEE Intelligent Systems.
Mark Nickson, Natural Language Meets IVR, Apr./May 1998, pp. 1-2 of Internet Site http://www.speechtechmag.com/issues/3_2/cover/433-1.html, Speech Technology Magazine.

* cited by examiner

*Primary Examiner*—Olisa Anwah
(74) *Attorney, Agent, or Firm*—Alston & Bird LLP

(57) ABSTRACT

A method and an apparatus for providing audio information to a user. The method and apparatus provide information in multiple modes that represent various pieces of information and/or alternatives.

38 Claims, 8 Drawing Sheets

METHOD AND SYSTEM FOR INTERJECTING COMMENTS TO IMPROVE INFORMATION PRESENTATION IN SPOKEN USER INTERFACES

TECHNICAL FIELD

The invention relates generally to telecommunications systems and, more particularly, to a method and an apparatus for providing comments and/or instructions in a voice interface.

BACKGROUND

Voice response systems, such as brokerage interactive voice response (IVR) systems, flight IVR systems, accounting systems, announcements, and the like, generally provide users with information. Furthermore, many voice response systems, particularly IVR systems, also allow users to enter data via an input device, such as a microphone, telephone keypad, keyboard, or the like.

The information/instructions that voice response systems provide are generally in the form of one or more menus, and each menu may comprise one or more menu items. The menus, however, can become long and monotonous, making it difficult for the user to identify and remember the relevant information.

Therefore, there is a need to provide audio information to a user in a manner that enhances the ability of the user to identify and remember the relevant information that may assist the user.

SUMMARY

The present invention provides a method and an apparatus for providing audio information to a user in multiple modes, allowing the user to easily identify the available options.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning telecommunications and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
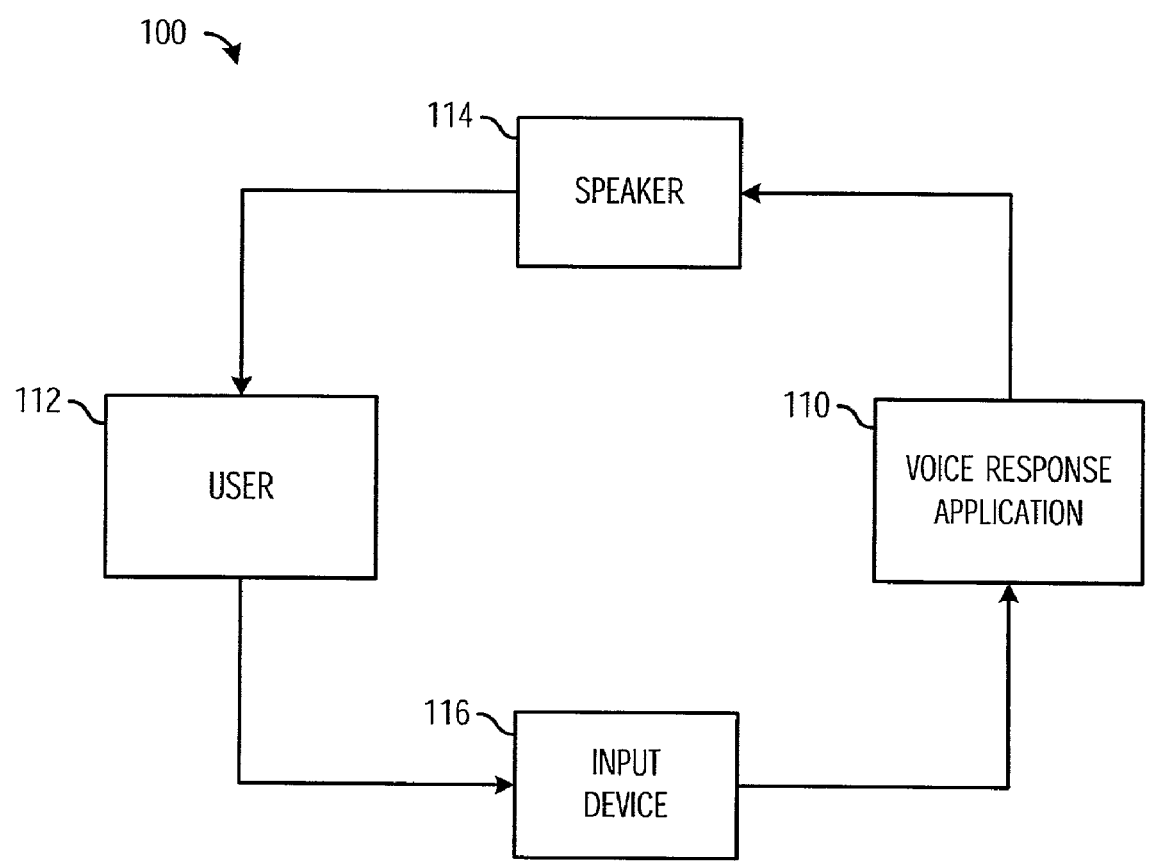
FIG. 1 schematically depicts a typical network environment that embodies the present invention.

Referring to FIG. 1 of the drawings, the reference numeral 100 generally designates a voice response system embodying features of the present invention. The voice response system 100 is exemplified herein as an interactive voice response (IVR) system that may be implemented in a telecommunications environment, though it is understood that other types of environments and/or applications may constitute the voice response system 100 as well, and that the voice response system 100 is not limited to being in a telecommunications environment and may, for example, include environments such as microphones attached to personal computers, voice portals, speech-enhanced services such as voice mail, personal assistant applications, and the like, speech interfaces with devices such as home appliances, communications devices, office equipment, vehicles, and the like, other applications/environments that utilize voice as a means for providing information, such as information provided over loudspeakers in public places, and the like.

The voice response system 100 generally comprises a voice response application 110 connected to one or more speakers 114, and configured to provide audio information via the one or more speakers 114 to one or more users, collectively referred to as the user 112. Optionally, an input device 116, such as a microphone, telephone handset, keyboard, telephone keypad, or the like, is connected to the voice response application 110 and is configured to allow the user 112 to enter alpha-numeric information, such as Dual-Tone Multi-Frequency (DTMF), ASCII representations from a keyboard, or the like, and/or audio information, such as voice commands.

In accordance with the present invention, the user 112 receives audio information from the voice response application 110 via the one or more speakers 114. The audio information may comprise information regarding directions or location of different areas in public locations, such as an airport, a bus terminal, sporting events, or the like, instructions regarding how to accomplish a task, such as receiving account balances, performing a transaction, or some other IVR-type of application, or the like. Other types of applications, particularly IVR-type applications, allow the user 112 to enter information via the input device 116, which the voice response application may use to generate and provide additional information.

Furthermore, it is conceived that the present invention may be utilized in an environment that combines presentation techniques, such as a visual presentation that may be used via a Graphical User Interface (GUI). For instance, the voice response system 100 may comprise of a kiosk in which a user is presented options graphically and verbally. The implementation of the present invention in such an environment will be obvious to one of ordinary skill in the art upon a reading of the present invention.

Therefore, the present invention is discussed in further detail below with reference to FIGS. 2-8 in the context of a billing IVR system. The billing IVR system is used for exemplary purposes only and should not limit the present invention in any manner. Additionally, the figures and the discussion that follows incorporate common features, such as barge-in, the use of DTMF and/or voice recognition, and the like, the details of which have been omitted so as not to obscure the present invention. Furthermore, details concerning call flows, voice recognition, error conditions, barge-in, and the like, have been largely omitted and will be obvious to one of ordinary skill in the art upon a reading of the present disclosure.

Figure 2:
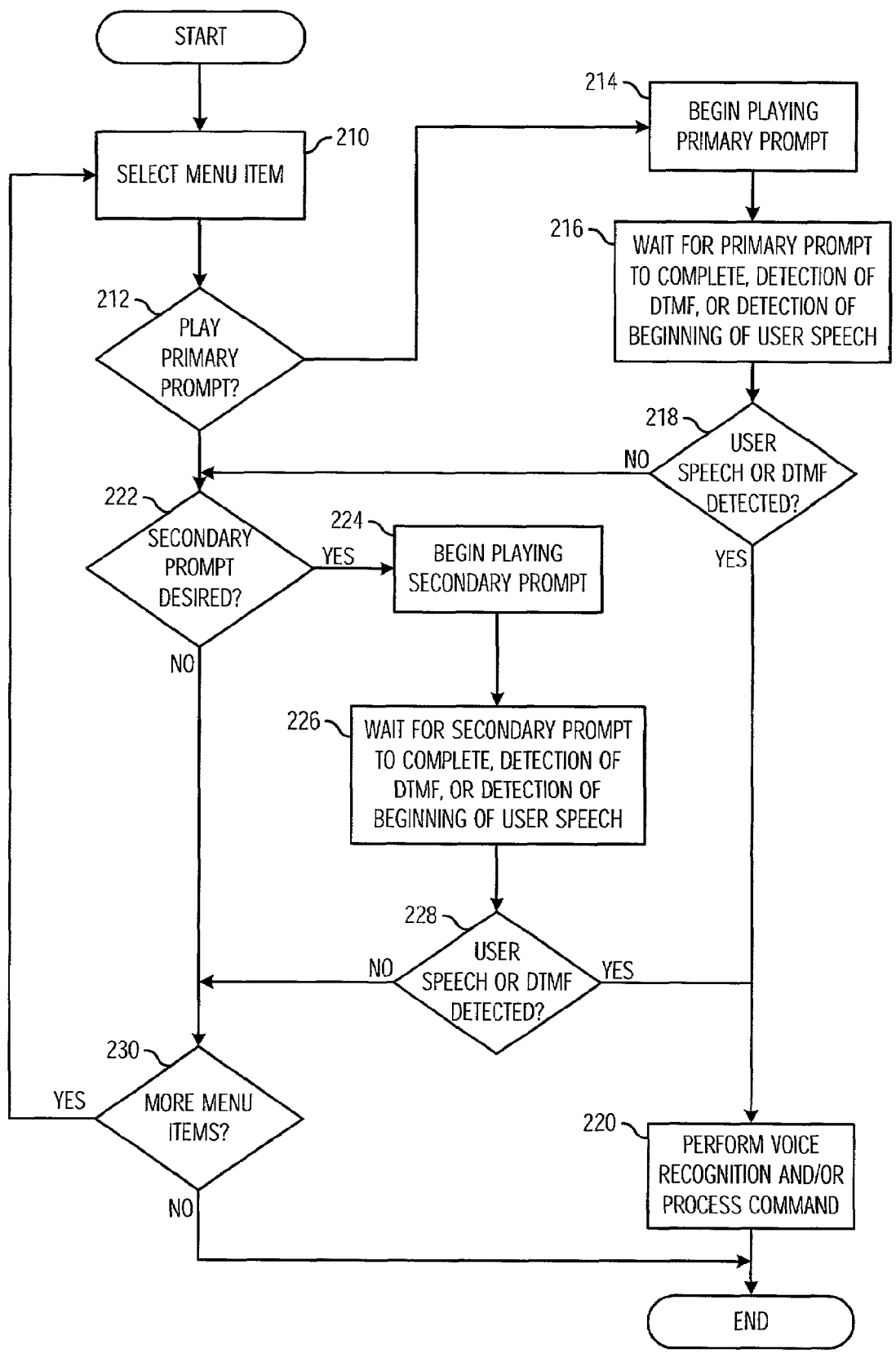
FIG. 2 is a data flow diagram illustrating one embodiment of the present invention in which a menu is presented verbally to a user.

FIG. 2 is a flow chart depicting steps that may be performed by the voice response system 100 in accordance with one embodiment of the present invention that verbally provides a secondary prompt for instructions and/or information given to users in the context of a billing IVR system. Processing begins in step 210, wherein a menu item that is to be presented to the user is selected from among one or more menu items of a menu. The selection of the menu item may be performed by any algorithm that is suitable for the particular application, such as a random selection, a predetermined ordering, user preferences, and the like.

Processing then proceeds to step 212, wherein a determination is made whether a primary prompt is to be played. Preferably, each menu item may be presented with only a primary prompt, only a secondary prompt, both a primary and a secondary prompt, or neither as determined by the application designer. Accordingly, if a primary prompt is desired, then processing proceeds to step 214, wherein the playing of a primary prompt for the selected menu item is initiated.

After the playing of a prompt is initiated in step 214, processing proceeds to step 216, wherein the voice response system 100 waits for the primary prompt to complete, for the detection of user speech, and/or for the detection of a DTMF command. Upon the occurrence of any or all of these events, processing proceeds to step 218, wherein a determination is made whether user speech and/or DTMF commands have been detected, i.e, whether the user has entered a command, either verbally or by using a keypad.

If, in step 218, a determination is made that user speech and/or DTMF commands have been detected, then processing proceeds to step 220, wherein voice recognition is performed, if required, and the command is processed. The process and method of performing voice recognition, and processing the command, is considered well known to one of ordinary skill in the art and, therefore, will not be discussed in greater detail.

If, however, in step 218, a determination is made that user speech and/or DTMF commands have not been detected, then processing proceeds to step 222, wherein a determination is made whether a secondary prompt is desired.

If, in step 222, a determination is made that a secondary prompt is desired, then processing proceeds to step 224, wherein the playing of the secondary prompt is initiated. The playing of the secondary prompt is discussed in further detail below with reference to FIG. 3. Preferably, the secondary prompt is played in such a manner that attracts user attention, such as playing the secondary prompt in a different voice than the primary prompt, with a different volume than the primary prompt, with a different tone than the primary prompt, with a different speed than the primary prompt, with a tone separating the secondary prompt and the primary prompt, and the like. Upon completion of step 224, processing proceeds to step 226, wherein the voice response system 100 waits for the secondary prompt to complete, detection of DTMF commands, or detection of user speech. Processing then proceeds to step 228, wherein a determination is made whether user speech and/or DTMF has been detected.

If, in step 228, a determination is made that user speech and/or DTMF commands have been detected, then processing proceeds to step 220, wherein voice recognition is performed and the command is processed, as discussed above.

If, however, in step 228, a determination is made that neither user speech nor a DTMF command have been detected, or, in step 222, a determination is made that a secondary prompt is not desired, then processing proceeds to step 230, wherein a determination is made whether there are more menu items to be processed. If a determination is made that there are more menu items to be processed, then processing returns to step 210, wherein the next menu item is selected and processed.

If, however, in step 230, a determination is made that there are no additional menu items to be processed, then processing of the menu terminates.

Figure 3:
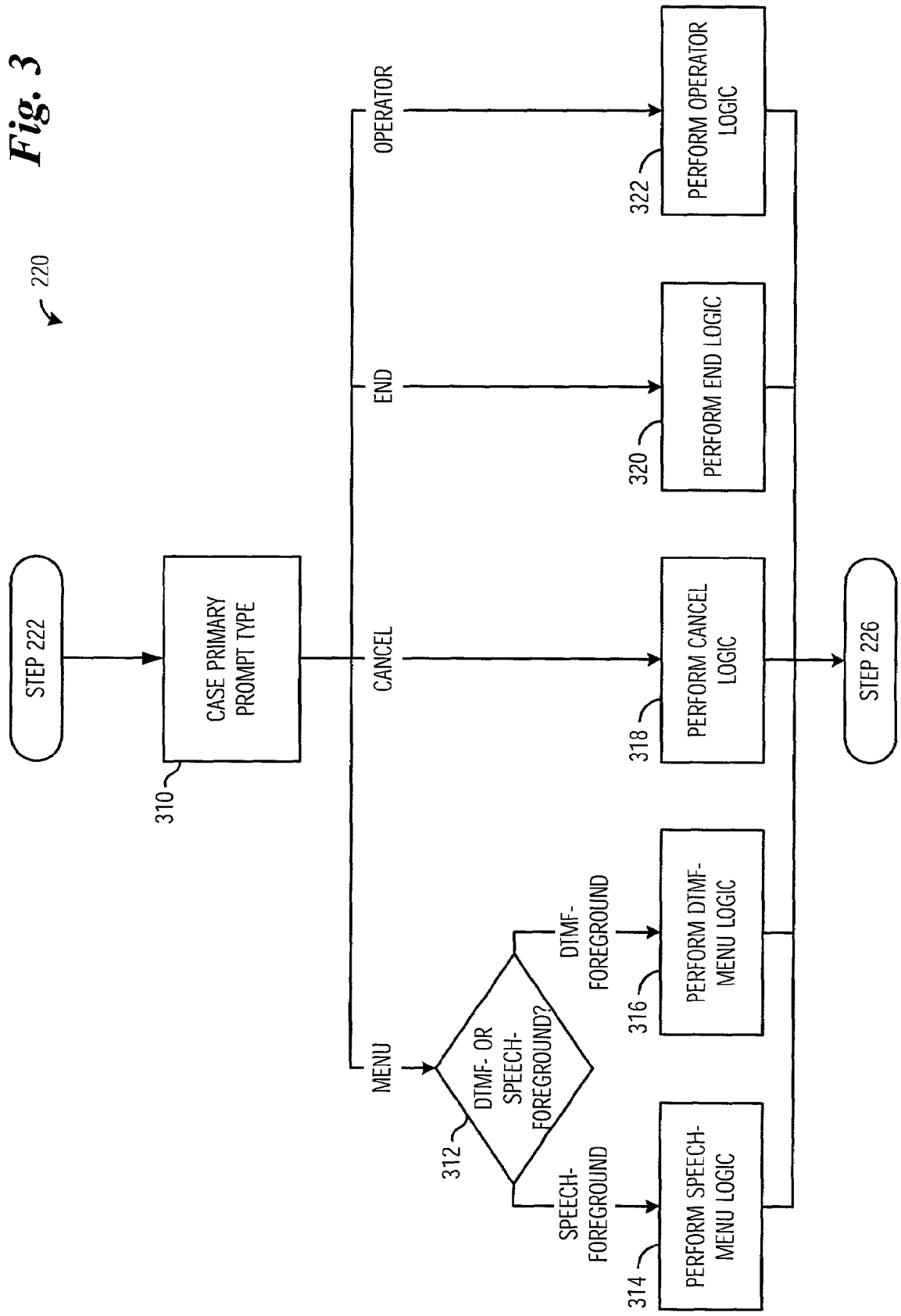
FIG. 3 is a data flow diagram illustrating one embodiment of the present invention in which a secondary prompt of a menu item is presented verbally to a user.

FIG. 3 is a flow chart depicting steps that may be performed in playing of the secondary prompt, discussed above with respect to step 224 (FIG. 2), in accordance with a preferred embodiment of the present invention. Accordingly, if a determination is made in step 222 (FIG. 2) that a secondary prompt is desired, then processing proceeds to step 224 (FIG. 2), the details of which are depicted by steps 310-322 of FIG. 3.

Processing begins in step 310, wherein the type of prompt is determined. Preferably, the content of the secondary prompt varies depending on the type of prompt, such as a menu item, a cancel command, an end command, an operator command, and the like. The present disclosure discusses the use of a secondary prompt in the context of a menu item, a cancel command, an end command, and an operator command for exemplary purposes only and should not limit the present invention in any manner. Accordingly, other commands, such as a main menu command, a backwards command, a yes/no command, and the like may also be implemented if desired/required by an application. The use of the secondary prompt with other commands and/or embodiments will be obvious to one of ordinary skill in the art upon a reading of the present disclosure.

If the primary prompt type is a menu item, then processing proceeds to step 312, wherein a determination is made whether the voice response system 100 is configured as a DTMF-foreground application or as a speech-foreground application. A DTMF-foreground application is an application that primarily requests DTMF input from the user, but also may accept voice input, and a speech-foreground application is an application that primarily requests speech input from the user, but also may accept DTMF input. Preferably, a primary prompt in a DTMF-foreground application requests DTMF input and the secondary prompt requests speech input. Similarly, a primary prompt in a speech-foreground application requests speech input and the secondary prompt requests DTMF input.

Figure 4:
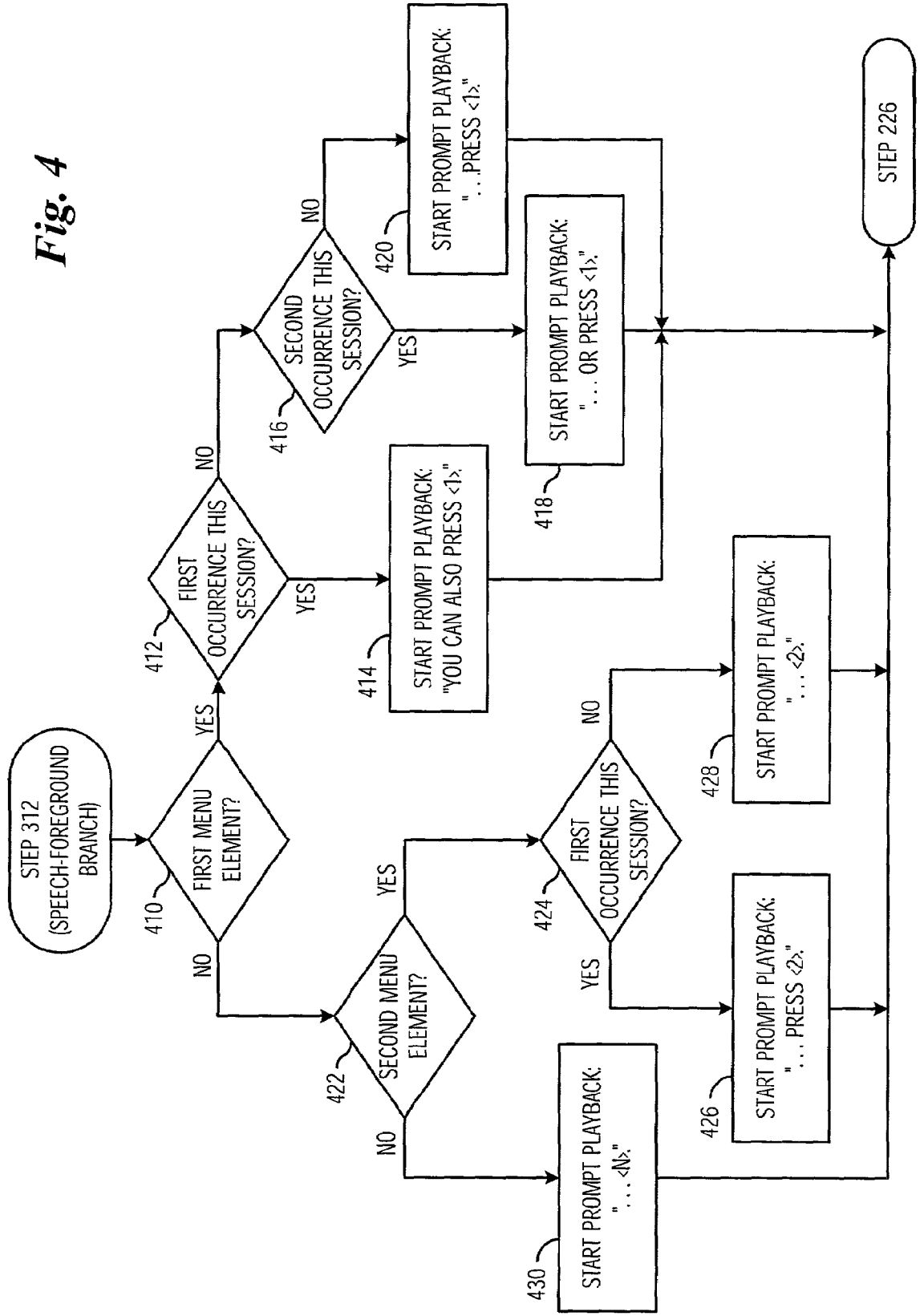
FIG. 4 is a data flow diagram illustrating one embodiment of the present invention in which a secondary prompt of a speech-foreground menu is presented verbally to a user.
Figure 5:
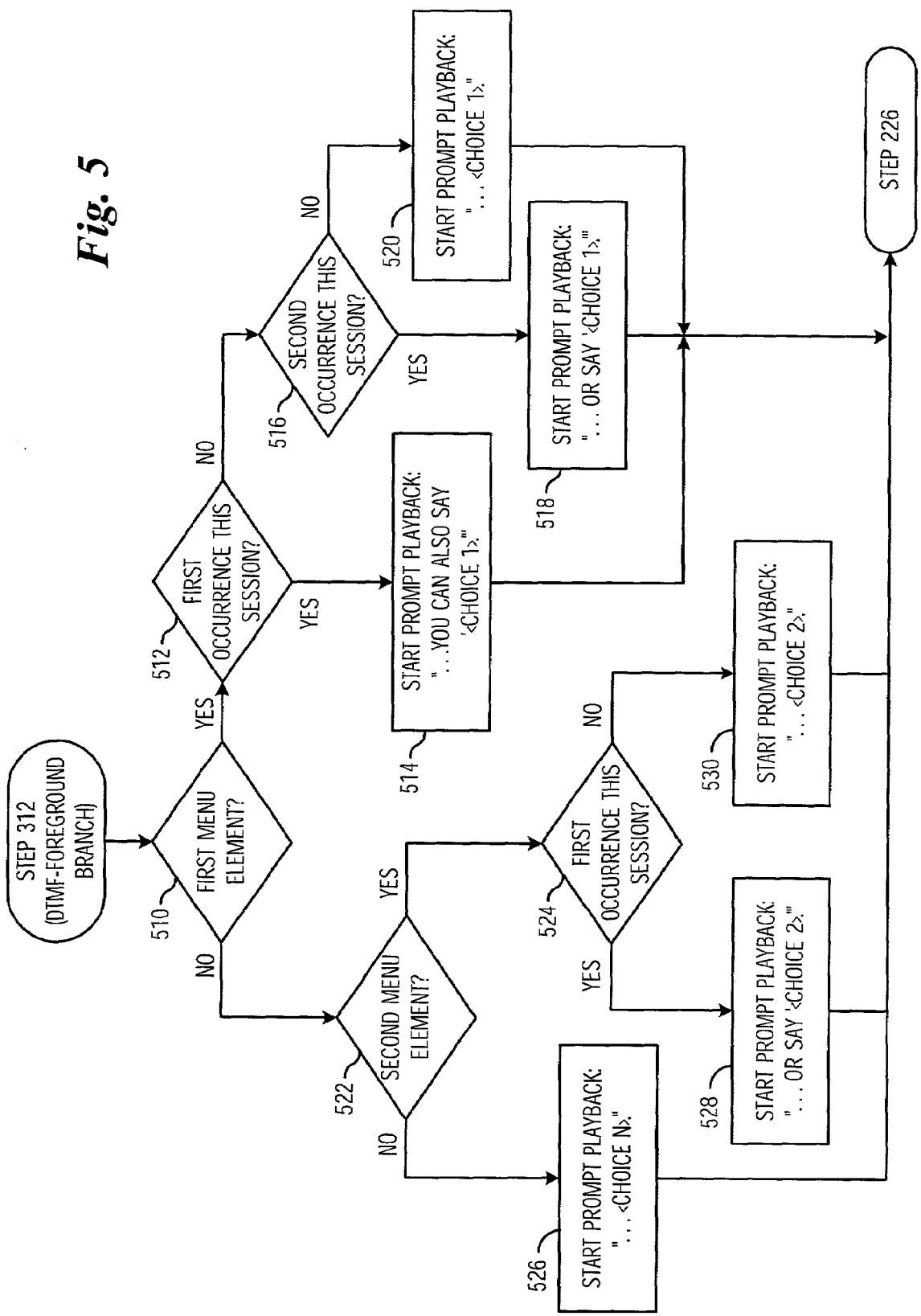
FIG. 5 is a data flow diagram illustrating one embodiment of the present invention in which a secondary prompt of a DTMF-foreground menu is presented verbally to a user.

Accordingly, if a determination is made that the voice response system 100 is a speech-foreground interface, then processing proceeds to step 314, wherein the speech-menu logic, which is discussed in greater detail below with reference to FIG. 4, is performed. If, in step 312, a determination is made that the voice response system 100 is a DTMF-foreground interface, then processing proceeds to step 316, wherein the DTMF-menu logic, which is discussed in greater detail below with reference to FIG. 5, is performed.

Figure 6:
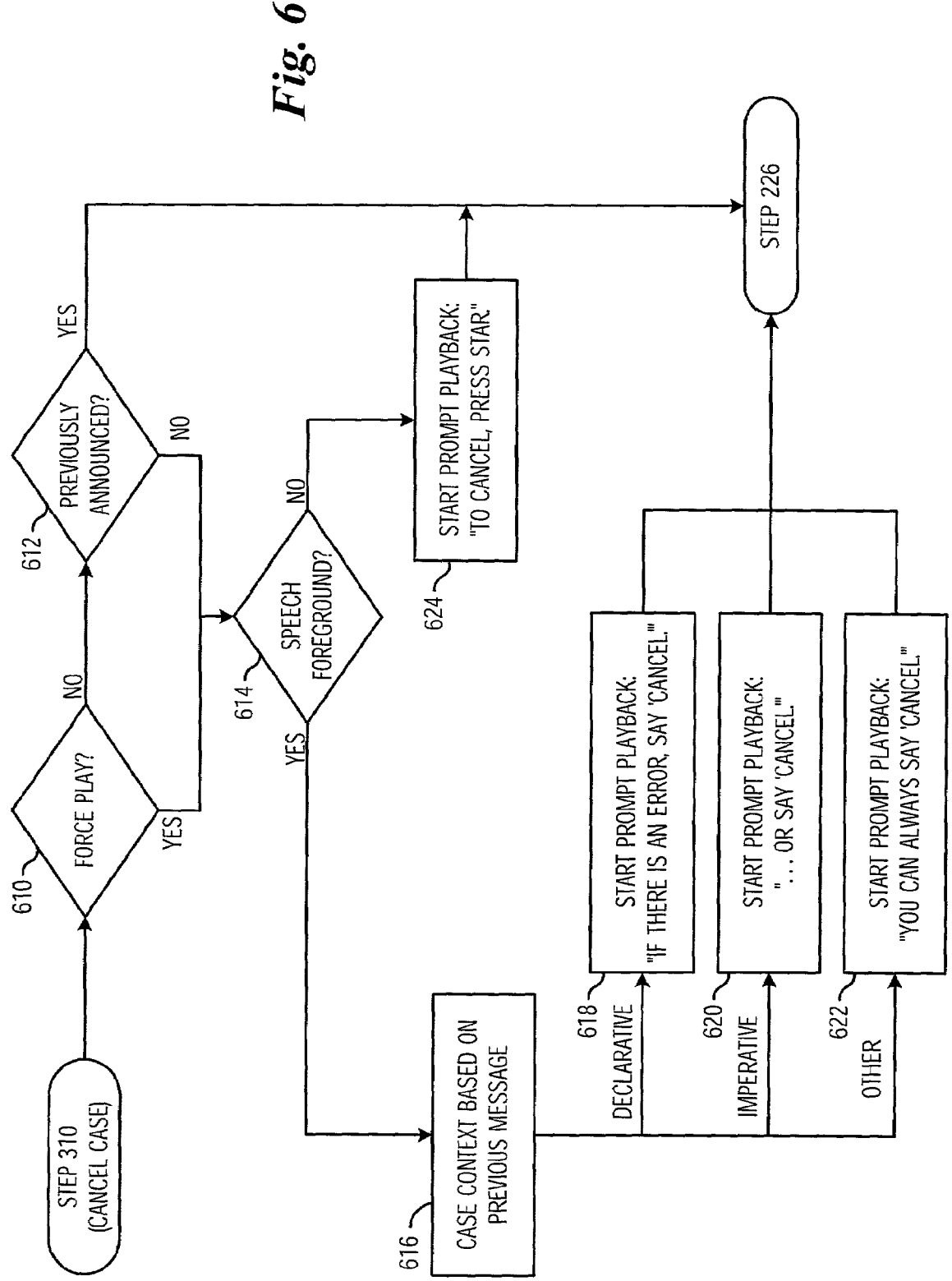
FIG. 6 is a data flow diagram illustrating one embodiment of the present invention in which a secondary prompt for a "CANCEL" command is presented verbally to a user.
Figure 7:
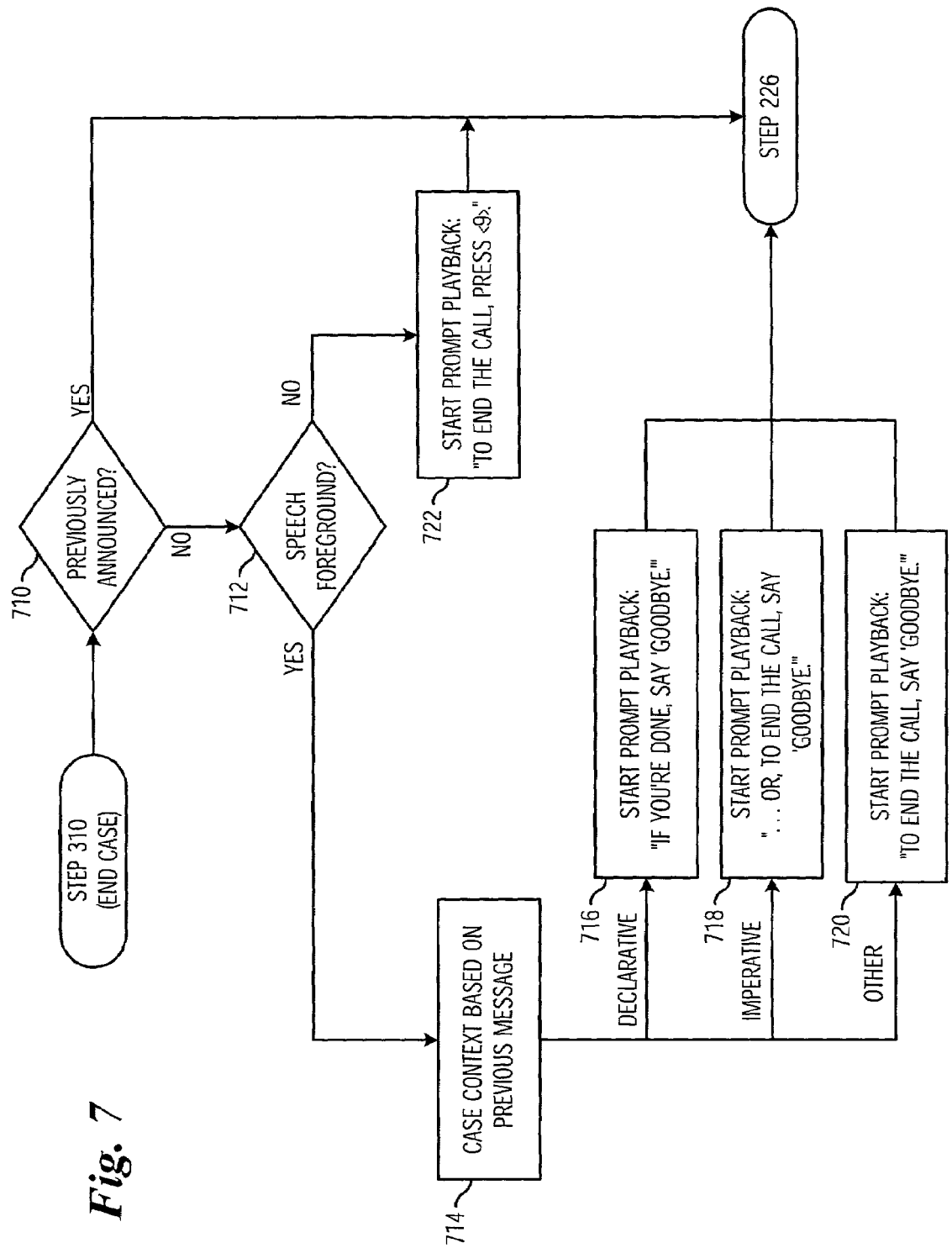
FIG. 7 is a data flow diagram illustrating one embodiment of the present invention in which a secondary prompt for an "END" command is presented verbally to a user.
Figure 8:
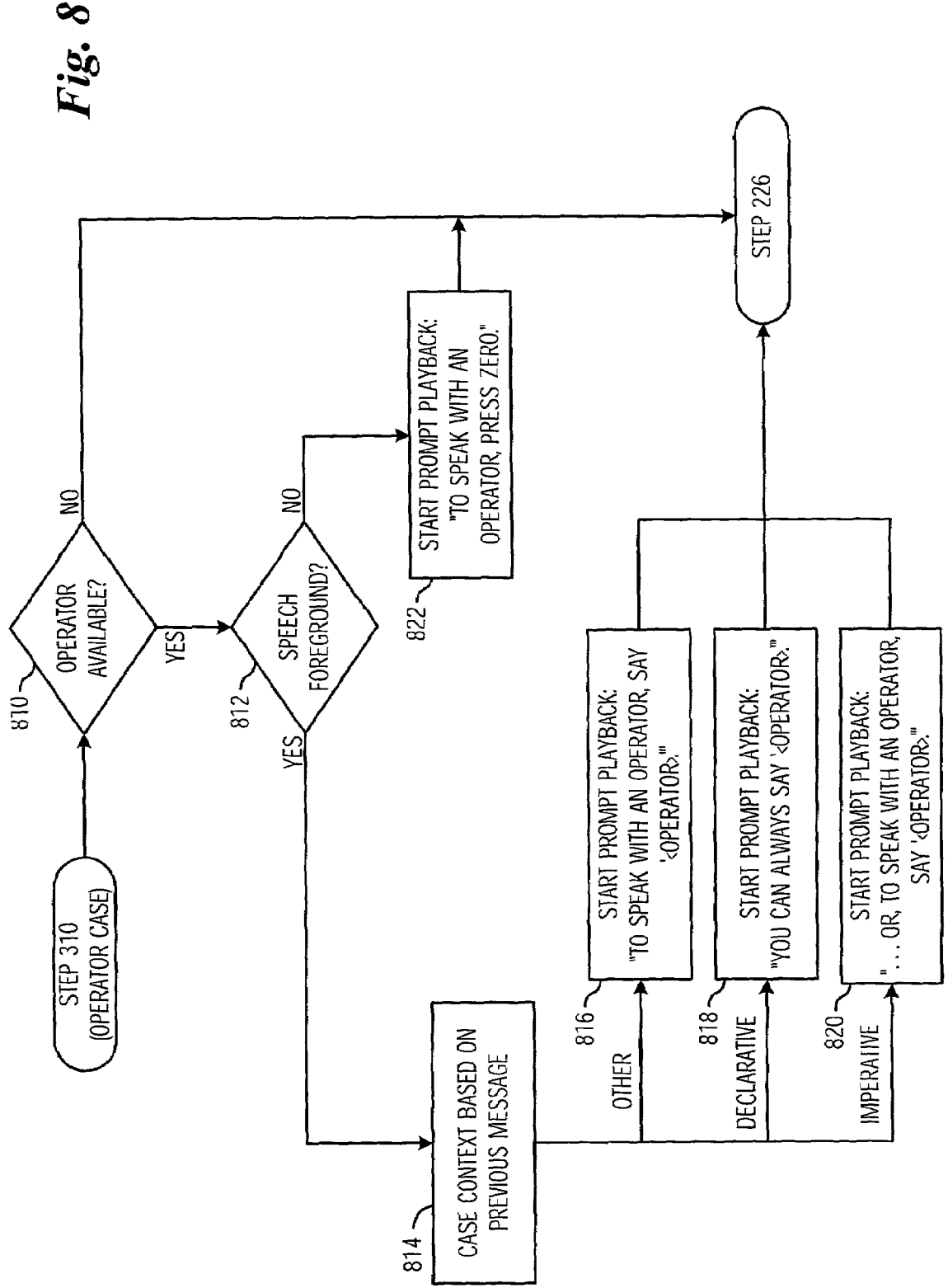
FIG. 8 is a data flow diagram illustrating one embodiment of the present invention in which a secondary prompt for an "OPERATOR" request is presented verbally to a user.

Similarly, if the primary prompt type is a cancel command, then processing proceeds to step 318, wherein the cancel logic, which is discussed in greater detail below with reference to FIG. 6, is performed. If the primary prompt type is an end command, then processing proceeds to step 320, wherein the end logic, which is discussed in greater detail below with reference to FIG. 7, is performed. If the primary prompt type is a operator command, then processing proceeds to step 322, wherein the operator logic, which is discussed in greater detail below with reference to FIG. 8, is performed.

Upon completion of step 314, 316, 318, 320, or 322, processing proceeds to step 226 (FIG. 2) as discussed above.

FIG. 4 is a flow chart depicting steps that may be performed in the speech-menu logic, discussed above with respect to step 314 (FIG. 3), in accordance with a preferred embodiment of the present invention. Accordingly, if a determination is made in step 312 (FIG. 3) that the voice response system 100 is configured as a speech-foreground application, then processing proceeds to step 314 (FIG. 3), the details of which are depicted by steps 410-430 of FIG. 4.

Processing begins in step 410, wherein a determination is made whether the current menu item is the first menu item of the menu. If a determination is made that the current menu item is the first menu item, then processing proceeds to step 412, wherein a determination is made whether the current menu item is the first occurrence of the menu item in the current session, i.e., the first time the user is presented with the current menu item as an option in the current session. Preferably, the voice response system 100 determines whether current menu item has been presented previously to the user in the current session as part of any menu, not necessarily the current menu. Alternatively, however, the voice response system 100 may determine whether the current menu item has been presented to the user as part of the current menu in the current session, i.e., determine whether the current menu has been presented to the user in the current session.

If, in step 412, a determination is made that the current menu item is the first occurrence of the menu item in the current session, then processing proceeds to step 414, wherein a full secondary prompt, such as "You can also press <1>.", where "<1>" indicates a DTMF key corresponding to the speech command given in the primary prompt for the first menu item, is played.

Preferably, no pause, or a small pause such as a pause of less than 1 second, occurs between the playing of the primary prompt and the playing of the secondary prompt. Alternatively, longer pauses, such as pauses of 2-5 seconds, or longer, may be used if required by a particular application.

If, in step 412, a determination is made that the current menu item is not the first occurrence of the menu item in the current session, then processing proceeds to step 416, wherein a determination is made whether the current menu item is the second occurrence of the menu item in the current session. If a determination is made that the current menu item is the second occurrence of the menu item in the current session, then processing proceeds to step 418, wherein a slightly-tapered secondary prompt, such as "Or press <1>.", is played.

If, however, in step 416, a determination is made that the menu item is not the second occurrence, i.e., third or greater occurrence, of the menu item in the current session, then processing proceeds to step 420, wherein a more-tapered secondary prompt, such as "press <1>.", is played.

If, in step 410, a determination is made that the current menu item is not the first menu item, then processing proceeds to step 422, wherein a determination is made whether the current menu item is the second menu item of the menu. If, in step 422, a determination is made that the current menu item is the second menu item, then processing proceeds to step 424, wherein a determination is made whether the current menu item is the first occurrence of the menu item in the current session. If a determination is made that the current menu item is the first occurrence of the menu item in the current session, then processing proceeds to step 426, wherein a slightly-tapered secondary prompt, such as "PRESS <2>," where "<2>" is the DTMF key corresponding to the primary prompt for the second menu item, is played.

If, in step 424, a determination is made that the menu item is not the first occurrence of the menu item in the current session, then processing proceeds to step 428, wherein a more-tapered secondary prompt, such as "<2>," is played.

If, in step 422, a determination is made that the current menu item is not the second menu item, i.e., the third or greater menu item, then processing proceeds to step 430, wherein a more-tapered secondary prompt, such as "<n>," where "<n>" is the DTMF key corresponding to the primary prompt for the nth menu item, is played.

Upon starting the prompts indicated in steps 414, 418, 420, 426, 428, or 430, processing proceeds to step 226 (FIG. 2).

For exemplary purposes only, the following prompts provide an example of the steps described above with reference to FIG. 4 for the first occurrence of a menu being presented to the user, where the primary prompt is in regular font, the secondary prompt is in italics, and the step in which the secondary prompt is played is indicated in brackets ("[ ]").

"You may say . . .
Billing and payments . . . *you can also press one.* [414]
New features and services . . . *press two.* [426]
Technical support . . . *three.* [430]
Other information . . . *four.* [430]"

The following prompts are an example of the second occurrence of the above menu that is presented to a user in the same session.

"You may say . . .
Billing and payments . . . *or press one.* [418]
New features and services . . . *two.* [428]
Technical support . . . *three.* [430]
Other information . . . *four.* [430]"

As can be appreciated from the above disclosure and the examples, it is preferred that the secondary prompt be tapered as the menu progresses and/or as the menu is presented to the user, maximizing user learning and throughput. Preferably, additional tapering is performed in two situations. First, the prompt is tapered as menu items are provided to the user within a single occurrence. This is illustrated in each of the above example occurrences by the prompt for the first two menu items and the first menu item, respectively, being longer than the others. Also note that in the example of the first occurrence above, the prompt is tapered twice, from the first prompt to the second prompt, and again from the second prompt to the third prompt.

Second, the prompt is tapered from the first occurrence of the menu to the second occurrence of the menu. For instance, the secondary prompt for the first menu item in the first occurrence is " . . . you can also press one" was tapered to " . . . or press one" in the second occurrence.

It should be noted, however, that the prompts given above, and elsewhere, are given for exemplary purposes only, and that prompts may be designed with more, less, or no tapering as required by a particular application. As such, the examples should not limit the present invention in any manner.

FIG. 5 is a flow chart depicting steps that may be performed in the DTMF-menu logic, discussed above with respect to step 316 (FIG. 3), in accordance with a preferred embodiment of the present invention. Accordingly, if a determination is made in step 312 (FIG. 3) that the voice response system 100 is configured as a DTMF-foreground application, then processing proceeds to step 316 (FIG. 3), the details of which are depicted by steps 510-530 of FIG.

The illustrated processing is similar to the processing discussed above with reference to FIG. 4, except that the prompts replace "PRESS <1>," "PRESS <2>," "<2>, " and "<N>" with "SAY <CHOICE 1>," "SAY <CHOICE 2>," "<CHOICE 2>," and "<CHOICE N>," respectively, where "<CHOICE 2>" is a verbal command corresponding to the option identified in the primary prompt.

The following prompts are an example of the steps described above with reference to FIG. 5 for the first occurrence of a menu being presented to the user, where the primary prompt is in regular font, the secondary prompt is in italics, and the step in which the secondary prompt is played is indicated in brackets ("[ ]").

"Main Menu . . .

For billing, payments, and account balance, press one . . . *you can also say 'accounts.'* [514]

To learn about new features and services, press two . . . *or say 'new features.'* [528]

For technical support on all products, press 3. . . *'technical support.'* [526]

For other information, press 4. . . *'other information.'"* [526]

The following prompts are an example of a second occurrence of the above menu that is presented to the user in the same session.

"Main Menu . . .

For billing, payments, and account balance, press one . . . *or say 'accounts.'* [518]

To learn about new features and services, press two . . . *'new features.'* [530]

For technical support on all products, press 3. . . *'technical support.'* [526]

For other information, press 4. . . *'other information.'"* [526]

For specific information regarding a particular step in FIG. 5, refer to the corresponding step in FIG. 4.

FIG. 6 is a flow chart depicting steps that may be performed in the cancel logic, discussed above with respect to step 318 (FIG. 3), in accordance with a preferred embodiment of the present invention. Accordingly, if a determination is made in step 310 (FIG. 3) that the primary prompt type is a cancel command, then processing proceeds to step 318 (FIG. 3), the details of which are depicted by steps 610-624 of FIG. 6.

Generally, voice response systems provide one or more commands, such as "cancel," to either stop a transaction or recover from some event, such as after a major transaction, after announcing a transfer or major decision, on repetitive misrecognitions and/or invalid commands, after a lengthy timeout, at locations in the application that may call for information, or the like. As will be discussed in further detail below, it is preferred that the secondary prompt be played once per session since the same command may be available in multiple instances. It is also preferred, however, that the application designer be given a mechanism to force the playing of the secondary prompt.

Accordingly, processing begins in step 610, wherein a determination is made whether the application designer is forcing the playing of the secondary cancel prompt. If a determination is not made that the application designer is forcing the playing of the secondary cancel prompt, then processing proceeds to step 612, wherein a determination is made whether the secondary cancel prompt has been previously played. If, in step 612, a determination is made that the secondary cancel prompt has been previously played, then processing for the secondary cancel prompt terminates and processing proceeds to step 226 (FIG. 2). Alternatively, the secondary cancel prompt is played for a predetermined number of times, such as 3-10 times per session, or repeated after the passage of a predetermined amount of time, such as 0.5-5 minutes, or the like.

If, in step 610, a determination is made that the application designer has forced the playing of the secondary cancel prompt, or, in step 612, a determination is made that the secondary cancel prompt has not been played previously, then processing proceeds to step 614, wherein a determination is made whether the application is in a speech-foreground mode. It should be noted that, unlike the processing discussed above with reference to FIGS. 4 and 5, it is preferred that in some situations, such as when a primary prompt for a menu item is not played or the like, the secondary prompt is played in the same style as the menu. In particular, it is preferred that for commands such as the "CANCEL" (FIG. 6), "END" (FIG. 7), and "OPERATOR" (FIG. 8) commands, and the like, that the primary prompt not be played and that the mode of the secondary prompt match the application mode. For example, if the application is in a speech-foreground mode and the primary prompt is not played, then it is preferred that the secondary prompt be played, if at all, in a speech-foreground mode.

Referring now back to FIG. 6, if, in step 614, a determination is made that the application is not in a speech-foreground mode, i.e., the application is in a DTMF-foreground mode, then processing proceeds to step 624, wherein the secondary prompt, "To cancel, press star," is played.

If, however, in step 614, a determination is made that the application is in a speech-foreground mode, then processing proceeds to step 616, wherein a determination is made whether the previous prompts or announcements were in a declarative form, such as, "You have $300 credit available," "Transferring to the operator," "Calling John Smith," or the like, in an imperative form, such as, "Say the security name," "Enter your account number," "Please hold for the operator," or the like, or in some other form, in order to provide a "human-like" and/or grammatically correct response to the user. Preferably, the form of the previous prompt is predetermined and provided to the control logic described above.

If, in step 616, a determination is made that the primary prompt was in a declarative form, then processing proceeds to step 618, wherein an appropriate secondary prompt, such as, "If there is an error, say 'cancel,'" is played. If, in step 616, a determination is made that the primary prompt was in an imperative form, then processing proceeds to step 620, wherein an appropriate secondary prompt, such as, ". . . or say 'cancel,'" is played. If however, in step 616, a determination is made that the primary prompt was in some other form, then processing proceeds to step 622, wherein an appropriate secondary prompt, such as, "You can always say 'cancel,'" is played.

Upon starting the prompts indicated in steps 618, 620, 622, or 624, then cancel logic processing terminates and processing proceeds to step 226 (FIG. 2).

FIG. 7 is a flow chart depicting steps that may be performed in the end logic, discussed above with respect to step 320 (FIG. 3), in accordance with a preferred embodiment of the present invention. Accordingly, if a determination is made in step 310 (FIG. 3) that the prompt type is an end command, then processing proceeds to step 320 (FIG. 3), the details of which are depicted by steps 710-722 of FIG. 7.

Processing begins in step 710, wherein a determination is made whether the secondary end prompt has been previously played. If, in step 710, a determination is made that the secondary end prompt has been previously played, then processing for the secondary end prompt terminates and processing proceeds to step 226 (FIG. 2). Alternatively, the secondary end prompt is played for a predetermined number of times, such as 3-10 times per session, or repeated after the passage of a predetermined amount of time, such as 0.5-5 minutes, or the like.

If, in step 710, a determination is made that the secondary end prompt has not been played previously, then processing proceeds to step 712, wherein a determination is made whether the application is in a speech-foreground mode. If a determination is made that the application is not in a speech-foreground mode, i.e., the application is in a DTMF-foreground mode, then processing proceeds to step 722, wherein the secondary prompt, "To end the call, press <9>," is played, wherein "<9>" corresponds to the DTMF key for ending the current session.

If, however, in step 712, a determination is made that the application is in a speech-foreground mode, then processing proceeds to step 714, wherein a determination is made whether the prompts for the previous menu item were in a declarative form, in an imperative form, or in some other form. Preferably, the form of the previous prompt is predetermined and provided to the control logic described above.

If, in step 714, a determination is made that the primary prompt was in a declarative form, then processing proceeds to step 716, wherein an appropriate secondary prompt, such as, "If you're done, say 'goodbye,'" is played. If, in step 714, a determination is made that the primary prompt was in an imperative form, then processing proceeds to step 718, wherein an appropriate secondary prompt, such as, " . . . or, to end the call, say 'goodbye,'" is played. If however, in step 714, a determination is made that the primary prompt was in some other form, then processing proceeds to step 720, wherein an appropriate secondary prompt, such as, "to end the call, say 'goodbye,'" is played.

Upon starting the prompts indicated in steps 716, 718, 720, or 722, then cancel logic processing terminates and processing proceeds to step 226 (FIG. 2).

FIG. 8 is a flow chart depicting steps that may be performed in the operator logic, discussed above with respect to step 322 (FIG. 3), in accordance with a preferred embodiment of the present invention. Accordingly, if a determination is made in step 310 (FIG. 3) that the prompt type is an operator prompt, then processing proceeds to step 322 (FIG. 3), the details of which are depicted by steps 810-822 of FIG. 8.

The processing steps of FIG. 8 are similar to the respective steps of FIG. 7, with the exception that step 810 makes a determination whether an operator is available. In some circumstances and/or applications, an operator may not be an alternative. If, in step 810, a determination is made that the operator is not available, then processing for the secondary operator prompt terminates and processing returns to step 226 (FIG. 2).

Refer to the corresponding steps of FIG. 7 for a description of the processing of the remaining steps of FIG. 8.

It is understood that the present invention can take many forms and embodiments. Accordingly, several variations may be made in the foregoing without departing from the spirit or the scope of the invention. For example, the secondary and primary prompts may be generated from a single text string used as input to a text-to-speech device and by altering the speech parameters of the text-to-speech device, and the presentation of the primary and/or secondary prompts other than verbally, such as the use of graphical icons or text on the display of a kiosk, computer, or the like.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method of providing an audio prompt to a user comprising information advising the user of the option to use DTMF input or speech input, the method comprising the steps of:

presenting a first audio indicator to the user of a first selection mode for an available option, wherein the first selection mode elicits DTMF input or speech input from the user; and presenting a second audio indicator to the user of a second selection mode for the available option, wherein the second selection mode elicits DTMF input or speech input from the user, wherein both the first and second indicators are scheduled and formatted for presentation together prior to detection of a first user input failure, each of the first and second indicators being audibly distinguishable by at least one audio attribute other than the words used or the mode specified, wherein the at least one audio attribute attracts user attention to the difference between the first selection mode and the second selection mode, and wherein the first selection mode elicits a different type of input from the second selection mode, such that if the first selection mode elicits DTMF input then the second selection mode elicits speech input, and if the first selection mode elicits speech input then the second selection mode elicits DTMF input.

2. The method of claim 1, wherein the presentation of the second mode differs from the presentation of the first mode in at least one of the recorded voice, the volume, the inflection, the tone, and the pace.

3. A method of providing audio information to a user comprising information advising the user of the option to use DTMF input or speech input, the method comprising the steps of:

playing a primary prompt in a first mode indicating to the user a first selection means for an available option, wherein the first selection means elicits DTMF input or speech input from the user;

determining whether the primary prompt is a DTMF-foreground prompt or a speech-foreground prompt;

upon a determination that the primary prompt is a DTMF-foreground prompt, playing a secondary prompt in a second mode indicating to the user a second selection means for the available option, the second prompt being a speech-foreground prompt requesting speech input; and upon a determination that the primary prompt is a speech-foreground prompt, playing a secondary prompt in a second mode indicating to the user a second selection means for the available option, the second prompt being a DTMF-foreground prompt requesting DTMF input, wherein both the primary prompt and the secondary prompt are scheduled and formatted for presentation together prior to detection of a first user input failure and are audibly distinguishable by at least one audio attribute other than the words used or the mode, and wherein the first selection means elicits a different type of input from the second selection means.

4. A method of providing audio information to a user comprising information advising the user of the option to use DTMF input or speech input, the method comprising the steps of:

playing a primary audio prompt in a first mode indicating to the user a first selection means for an available option, wherein the first selection means elicits one of DTMF input or speech input from the user;

determining whether a secondary audio prompt is to be played to the user; and upon a determination that the secondary audio prompt is to be played to the user, playing the secondary prompt in a second mode indicating to the user a second selection means for the available option, wherein the second selection means elicits one of DTMF input or speech input from the user, wherein both the primary audio prompt and the secondary audio prompt are scheduled and formatted for presentation together prior to detection of a first user input failure and are audibly distinguishable by at least one audio attribute other than the words used or the mode, and wherein the first selection means elicits a different type of input from the second selection means, such that if the first selection means elicits DTMF input then the second selection means elicits speech input, and if the first selection means elicits speech input then the second selection means elicits DTMF input.

5. A method of providing audio information to a user comprising information advising the user of the option to use DTMF input or speech input, the method comprising the steps of:

determining whether a primary audio prompt is to be played;

upon a determination that the primary audio prompt is to be played, playing the primary audio prompt in a first mode indicating to the user a first selection means for an available option, wherein the first selection means elicits one of DTMF input or speech input from the user;

determining whether a secondary audio prompt is to be played; and upon a determination that the secondary audio prompt is to be played, playing the secondary audio prompt in a second mode indicating to the user a second selection means for the available option, wherein the second selection means elicits DTMF input or speech input from the user, wherein both the primary audio prompt and the secondary audio prompt are scheduled and formatted for presentation together prior to detection of a first user input failure and are audibly distinguishable by at least one audio attribute other than the words used or the mode, and wherein the first selection means elicits a different type of input from the second selection means, such that if the first selection means elicits DTMF input then the second selection means elicits speech input, and if the first selection means elicits speech input then the second selection means elicits DTMF input.

6. A method of providing a menu to a user comprising information advising the user of the option to use DTMF input or speech input, the method comprising the steps of:

playing a primary prompt in a first mode indicating to the user a first selection means for an available option, wherein the first selection means elicits one of DTMF input or speech input from the user; and playing a secondary prompt in a second mode indicating to the user a second selection means for the available option, the secondary prompt being tapered based on a position of the secondary prompt within the menu, wherein the second selection means elicits one of DTMF input or speech input from the user, wherein both the primary prompt and the secondary prompt are scheduled and formatted for presentation in the same machine turn and are audibly distinguishable by at least one audio attribute other than the words used or the mode, and wherein the first selection means elicits a different type of input from the second selection means, such that if the first selection means elicits DTMF input then the second selection means elicits speech input, and if the first selection means elicits speech input then the second selection means elicits DTMF input.

7. A method of providing a menu to a user comprising information advising the user of the option to use DTMF input or speech input, the method comprising the steps of:

determining whether a secondary prompt for a menu item of the menu has been played a predetermined number of times to assure that the user is aware of alternative means of selection, wherein the alternative means of selection comprises at least DTMF input and speech input from the user; and upon a determination that the secondary prompt has not been played a predetermined number of times, playing a secondary prompt in a second mode, wherein both a primary prompt in a first mode and the secondary prompt are scheduled and formatted for presentation together prior to detection of a first user input failure, wherein the primary prompt and the secondary prompt are audibly distinguishable by at least one audio attribute other than the words used or the mode, and wherein the first mode elicits a different type of input from the second mode, such that if the first mode elicits DTMF input then the second mode elicits speech input, and if the first mode elicits speech input then the second mode elicits DTMF input.

8. An apparatus for providing audio information to a user comprising information advising the user of the option to use DTMF input or speech input, the apparatus comprising:

means for presenting a first audio prompt in a first mode indicating to the user a first selection means for an available option, wherein the first selection means elicits one of DTMF input or speech input from the user; and means for presenting a second audio prompt in a second mode indicating to the user a second selection means for the available option, wherein the second selection means DTMF input or speech input from the user, wherein both the first audio prompt and the second audio prompt are scheduled and formatted for presentation together prior to detection of a first user input failure and are audibly distinguishable by at least one audio attribute other than the words used or the mode, wherein the at least one audio attribute attracts user attention to the difference between the first selection means and the second selection means, and wherein the first selection means elicits a different type of input from the second selection means, such that if the first selection means elicits DTMF input then the second selection means elicits speech input, and if the first selection means elicits speech input then the second selection means elicits DTMF input.

9. The apparatus of claim 8, wherein the presentation of the second mode differs from the presentation of the first mode in at least one of the recorded voice, the volume, the inflection, the tone, and the pace.

10. An apparatus for providing audio information to a user comprising information advising the user of the option to use DTMF input or speech input, the apparatus comprising:
   means for playing a primary prompt in a first mode indicating to the user a first selection means for an available option, wherein the first selection means elicits one of DTMF input or speech input from the user;
   means for determining whether the primary prompt is a DTMF-foreground prompt or a speech-foreground prompt;
   upon a determination that the primary prompt is a DTMF-foreground prompt, means for playing a secondary prompt in a second mode indicating to the user a second selection means for the available option, the second prompt being a speech-foreground prompt requesting speech input; and
   upon a determination that the primary prompt is a speech-foreground prompt, means for playing a secondary prompt in a second mode indicating to the user a second selection means for the available option, the second prompt being a DTMF-foreground prompt requesting DTMF input, wherein both the primary prompt and the secondary prompt are scheduled and formatted for presentation together prior to detection of a first user input failure and are audibly distinguishable by at least one audio attribute other than the words used or the mode, and wherein the first selection means elicits a different type of input from the second selection means.

11. An apparatus for providing audio information to a user comprising information advising the user of the option to use DTMF input or speech input, the apparatus comprising:
   means for playing a primary audio prompt in a first mode indicating to the user a first selection means for an available option, wherein the first selection means elicits one of DTMF input or speech input from the user;
   means for determining whether a secondary audio prompt is to be played to the user; and
   upon a determination that the secondary audio prompt is to be played to the user, means for playing the secondary audio prompt in a second mode indicating to the user a second selection means for the available option, wherein the second selection means elicits one of DTMF input or speech input from the user, wherein both the primary audio prompt and the secondary audio prompt are scheduled and formatted for presentation together prior to detection of a first user input failure and are audibly distinguishable by at least one audio attribute other than the words used or the mode, and wherein the first selection means elicits a different type of input from the second selection means, such that if the first selection means elicits DTMF input then the second selection means elicits speech input, and if the first selection means elicits speech input then the second selection means elicits DTMF input.

12. An apparatus for providing audio information to a user comprising information advising the user of the option to use DTMF input or speech input, the apparatus comprising:
   means for determining whether a primary audio prompt is to be played;
   upon a determination that the primary audio prompt is to be played, means for playing a primary prompt in a first mode indicating to the user a first selection means for an available option, wherein the first selection means elicits one of DTMF input or speech input from the user;
   means for determining whether a secondary audio prompt is to be played; and
   upon a determination that the secondary audio prompt is to be played, means for playing the secondary audio prompt in a second mode indicating to the user a second selection means for the available option, wherein the second selection means elicits one of DTMF input or speech input from the user, wherein both the primary audio prompt and secondary audio prompt are scheduled and formatted for presentation together prior to detection of a first user input failure and are audibly distinguishable by at least one audio attribute other than the words used or the mode, and wherein the first selection means elicits a different type of input from the second selection means, such that if the first selection means elicits DTMF input then the second selection means elicits speech input, and if the first selection means elicits speech input then the second selection means elicits DTMF input.

13. An apparatus for providing a menu to a user comprising information advising the user of the option to use DTMF input or speech input, the apparatus comprising:
   means for playing a primary prompt in a first mode indicating to the user a first selection means for an available option, wherein the first selection means elicits one of DTMF input or speech input from the user; and
   means for playing a secondary prompt in a second mode indicating to the user a second selection means for the available option, the secondary prompt being tapered based on a position of the secondary prompt within the menu, wherein the second selection means elicits one of DTMF input or speech input from the user, wherein both the primary prompt and the secondary prompt are scheduled and formatted for presentation in the same machine turn and are audibly distinguishable by at least one audio attribute other than the words used or the mode, and wherein the first selection means elicits a different type of input from the second selection means, such that if the first selection means elicits DTMF input then the second selection means elicits speech input, and if the first selection means elicits speech input then the second selection means elicits DTMF input.

14. An apparatus for providing a menu to a user comprising information advising the user of the option to use DTMF input or speech input, the apparatus comprising:
   means for determining whether a secondary prompt for a menu item of the menu has been played a predetermined number of times to assure that the user is aware of alternative means of selection, wherein the alternative means of selection comprises at least DTMF input and speech input from the user; and
   upon a determination that the secondary prompt has not been played a predetermined number of times, means for playing the secondary prompt in a second mode, wherein both a primary prompt in a first mode and the secondary prompt are scheduled and formatted for presentation together prior to detection of a first user input failure, wherein the primary prompt and the secondary prompt are audibly distinguishable by at least one audio attribute other than the words used or the mode, and wherein the first mode elicits a different type of input from the second mode, such that if the first mode elicits DTMF input then the second mode elicits speech input, and if the first mode elicits speech input then the second mode elicits DTMF input.

15. A computer program product for providing audio information to a user comprising information advising the user of the option to use DTMF input or speech input, the computer program product having a medium with a computer program embodied thereon, the computer program comprising:
computer program code for playing a primary prompt in a first mode indicating to the user a first selection means for an available option, wherein the first selection means elicits DTMF input or speech input from the user;
computer program code for determining whether the primary prompt is a DTMF-foreground prompt or a speech-foreground prompt;
upon a determination that the primary prompt is a DTMF-foreground prompt, computer program code for playing a secondary prompt in a second mode indicating to the user a second selection means for the available option, the second prompt being a speech-foreground prompt requesting speech input; and
upon a determination that the primary prompt is a speech-foreground prompt, computer program code for playing a secondary prompt in a second mode indicating to the user a second selection means for the available option, the second prompt being a DTMF-foreground prompt requesting DTMF input, wherein both the primary prompt and the secondary prompt are scheduled and formatted for presentation together prior to detection of a first user input failure and are audibly distinguishable by at least one audio attribute other than the words used or the mode, and wherein the first selection means elicits a different type of input from the second selection means.

16. A computer program product for providing audio information to a user comprising information advising the user of the option to use DMTF input or speech input, the computer program product having a medium with a computer program embodied thereon, the computer program comprising:
computer program code for playing a primary audio prompt in a first mode indicating to the user a first selection means for an available option, wherein the first selection means elicits DTMF input or speech input from the user;
computer program code for determining whether a secondary audio prompt is to be played to the user; and
upon a determination that the secondary audio prompt is to be played to the user, computer program code for playing the secondary audio prompt in a second mode indicating to the user a second selection means for the available option, wherein the second selection means elicits DTMF input or speech input from the user, wherein both the primary audio prompt and the secondary audio prompt are scheduled and formatted for presentation together prior to detection of a first user input failure and are audibly distinguishable by at least one audio attribute other than the words used or the mode, and wherein the first selection means elicits a different type of input from the second selection means, such that if the first selection means elicits DTMF input then the second selection means elicits speech input, and if the first selection means elicits speech input then the second selection means elicits DTMF input.

17. A computer program product for providing audio information to a user comprising information advising the user of the option to use DTMF input or speech input, the computer program product having a medium with a computer program embodied thereon, the computer program comprising:
computer program code for determining whether a primary prompt is to be played;
upon a determination that a primary audio prompt is to be played, computer program code for playing primary audio prompt in a first mode indicating to the user a first selection means for an available option, wherein the first selection means elicits one of DTMF input or speech input from the user;
computer program code for determining whether a secondary audio prompt is to be played; and
upon a determination that the secondary audio prompt is to be played, computer program code for playing the secondary audio prompt in a second mode indicating to the user a second selection means for the available option, wherein the second selection means elicits one of DTMF input or speech input from the user, wherein both the primary audio prompt and the secondary audio prompt are scheduled and formatted for presentation together prior to detection of a first user input failure and are audibly distinguishable by at least one audio attribute other than the words used or the mode, and wherein the first selection means elicits a different type of input from the second selection means, such that if the first selection means elicits DTMF input then the second selection means elicits speech input, and if the first selection means elicits speech input then the second selection means elicits DTMF input.

18. A computer program product for providing a menu to a user comprising information advising the user of the option to use DTMF input or speech input, the computer program product having a medium with a computer program embodied thereon, the computer program comprising:
computer program code for playing a primary prompt in a first mode indicating to the user a first selection means for an available option, wherein the first selection means elicits one of DTMF input or speech input from the user; and
computer program code for playing a secondary prompt in a second mode indicating to the user a second selection means for the available option, the secondary prompt being tapered based on a position of the secondary prompt within the menu, wherein the second selection means elicits one of DTMF input or speech input from the user, wherein both the primary prompt and the secondary prompt are scheduled and formatted for presentation in the same machine turn, and wherein the first selection means elicits a different type of input from the second selection means, such that if the first selection means elicits DTMF input then the second selection means elicits speech input, and if the first selection means elicits speech input then the second selection means elicits DTMF input.

19. A computer program product for providing a menu to a user comprising information advising the user of the option to use DTMF input or speech input, the computer program product having a medium with a computer program embodied thereon, the computer program comprising:
computer program code for determining whether a secondary prompt for a menu item of the menu has been played a predetermined number of times; and upon a determination that the secondary prompt has not been played a predetermined number of times, computer program code for playing a secondary prompt in a second mode, wherein both a primary prompt in a first mode and the secondary prompt are scheduled and formatted for presentation together prior to detection of a first user input failure, wherein the primary prompt and the secondary prompt are audibly distinguishable by at least one audio attribute other than the words used or the mode, and wherein the first mode elicits a different type of input from the second mode, such that if the first mode elicits DTMF input then the second mode elicits speech input, and if the first mode elicits speech input then the second mode elicits DTMF input.

20. A method of providing audio information to a user comprising information advising the user of the option to use DTMF input or speech input, the method comprising the steps of:
   presenting an audio prompt made up of two or more components, with the first component indicating to the user both the option being offered and a first option selection mode, wherein the first option selection mode elicits DTMF input or speech input from the user; and
   a subsequent component, indicating to the user subsequent selections being offered and subsequent selection modes, wherein the subsequent selection modes request DTMF input or speech input, wherein the first component and the subsequent component are scheduled and formatted for presentation together prior to detection of a first user input failure and are audibly distinguishable by at least one audio attribute other than the words used or the mode, wherein the at least one audio attribute attracts user attention to the difference between the first option selection mode and the subsequent selection modes, and wherein the first option selection mode elicits a different type of input from the subsequent selection modes, such that if the first option selection mode elicits DTMF input then at least one subsequent selection mode elicits speech input, and if the first option selection mode elicits speech input then at least one subsequent selection mode elicits DTMF input.

21. A voice response system for providing audio information to a user comprising information advising the user of the option to use DTMF input or speech input, the system comprising:
   a device presenting a first audio prompt in a first mode indicating to the user a first selection means for an available option, wherein the first selection means elicits one of DTMF input or speech input from the user; and
   a device presenting a second audio prompt in a second mode indicating to the user a second selection means for the available option, wherein the second selection means elicits one of DTMF input or speech input from the user, wherein both the first audio prompt and the second audio prompt are scheduled and formatted for presentation together prior to detection of a first user input failure and are audibly distinguishable by at least one audio attribute other than the words used or the mode, wherein the at least one audio attribute attracts user attention to the difference between the first selection means and the second selection means, and wherein the first selection means elicits a different type of input from the second selection means, such that if the first selection means elicits DTMF input then the second selection means elicits speech input, and if the first selection means elicits speech input then the second selection means elicits DTMF input.

22. The system of claim 21, wherein the presentation of the second mode differs from the presentation of the first mode in at least one of the recorded voice, the volume, the inflection, the tone, and the pace.

23. A voice response system for providing audio information to a user comprising information advising the user of the option to use DTMF input or speech input, the system comprising:
   a device playing a primary prompt in a first mode indicating to the user a first selection means for an available option, wherein the first selection means elicits one of DTMF input or speech input from the user;
   a device determining whether the primary prompt is a DTMF-foreground prompt or a speech-foreground prompt;
   upon a determination that the primary prompt is a DTMF-foreground prompt, a device playing a secondary prompt in a second mode indicating to the user a second selection means for the available option, the second prompt being a speech-foreground prompt requesting speech input; and
   upon a determination that the primary prompt is a speech-foreground prompt, a device playing a secondary prompt in a second mode indicating to the user a second selection means for the available option, the second prompt being a DTMF-foreground prompt requesting DTMF input, wherein both the primary prompt and the secondary prompt are scheduled and formatted for presentation together prior to detection of a first user input failure and are audibly distinguishable by at least one audio attribute other than the words used or the mode, and wherein the first selection means elicits a different type of input from the second selection means.

24. A voice response system for providing audio information to a user comprising information advising the user of the option to use DTMF input or speech input, the system comprising:
   a device playing a primary audio prompt in a first mode indicating to the user a first selection means for an available option, wherein the first selection means elicits one of DTMF input or speech input from the user;
   a device determining whether a secondary audio prompt is to be played to the user; and
   upon a determination that the secondary audio prompt is to be played to the user, a device playing the secondary audio prompt in a second mode indicating to the user a second selection means for the available option, wherein the second selection means elicits DTMF input or speech input from the user, wherein both the primary audio prompt and the secondary audio prompt are scheduled and formatted for presentation together prior to detection of a first user input failure and are audibly distinguishable by at least one audio attribute other than the words used or the mode, and wherein the first selection means elicits a different type of input from the second selection means, such that if the first selection means elicits DTMF input then the second selection means elicits speech input, and if the first selection means elicits speech input then the second selection means elicits DTMF input.

25. A voice response system for providing audio information to a user comprising information advising the user of the option to use DTMF input or speech input, the system comprising:
   a device determining whether a primary audio prompt is to be played;

upon a determination that the primary audio prompt is to be played, a device playing a primary prompt in a first mode indicating to the user a first selection means for an available option, wherein the first selection means elicits one of DTMF input or speech input from the user;

a device determining whether a secondary audio prompt is to be played; and upon a determination that the secondary audio prompt is to be played, a device playing the secondary audio prompt in a second mode indicating to the user a second selection means for the available option, wherein the second selection means elicits one of DTMF input or speech input from the user, wherein both the primary audio prompt and secondary audio prompt are scheduled and formatted for presentation together prior to detection of a first user input failure and are audibly distinguishable by at least one audio attribute other than the words used or the mode, and wherein the first selection means elicits a different type of input from the second selection means, such that if the first selection means elicits DTMF input then the second selection means elicits speech input, and if the first selection means elicits speech input then the second selection means elicits DTMF input.

26. The voice response system of claim 25, wherein the first selection means relates to currently available menu items and the second selection means relates to at least one command option available in multiple instances.

27. A voice response system for providing a menu to a user comprising information advising the user of the option to use DTMF input or speech input, the system comprising:

a device playing a primary prompt in a first mode indicating to the user a first selection means for an available option, wherein the first selection means elicits one of DTMF input or speech input from the user; and a device playing a secondary prompt in a second mode indicating to the user a second selection means for the available option, the secondary prompt being tapered based on a position of the secondary prompt within the menu, wherein the second selection means elicits one of DTMF input or speech input from the user, wherein both the primary prompt and the secondary prompt are scheduled and formatted for presentation in the same machine turn and are audibly distinguishable by at least one audio attribute other than the words used or the mode, and wherein the first selection means elicits a different type of input from the second selection means, such that if the first selection means elicits DTMF input then the second selection means elicits speech input, and if the first selection means elicits speech input then the second selections means elicits DTMF input.

28. A voice response system for providing a menu to a user comprising information advising the user of the option to use DTMF input or speech input, the system comprising:

a device determining whether a secondary prompt for a menu item of the menu has been played a predetermined number of times to assure that the user is aware of alternative means of selection, wherein the alternative means of selection comprises at least DTMF input and speech input from the user; and upon a determination that the secondary prompt has not been played a predetermined number of times, a device playing the secondary prompt in a second mode, wherein both a primary prompt in a first mode and the secondary prompt are scheduled and formatted for presentation together prior to detection of a first user input failure and are audibly distinguishable by at least one audio attribute other than the words used or the mode, wherein the primary prompt and the secondary prompt are audibly distinguishable by at least one audio attribute, and wherein the first mode elicits a different type of input than the second mode, such that if the first mode elicits DTMF input then the second mode elicits speech input, and if the first mode elicits speech input then the second mode elicits DTMF input.

29. The voice response system of claim 27, wherein the presentation of the second mode differs from the presentation of the first mode in at least one of the recorded voice, the volume, the inflection, the tone, and the pace.

30. The method of claim 6, wherein the secondary prompt is further tapered for at least one of the number of occurrences the available option has been presented to the user.

31. The apparatus of claim 13, wherein the secondary prompt is further tapered for at least one of the number of occurrences the available option has been presented to the user.

32. The computer program of claim 18, wherein the secondary prompt is further tapered for at least one of the number of occurrences the available option has been presented to the user.

33. The system of claim 27, wherein the secondary prompt is further tapered for at least one of the number of occurrences the available option has been presented to the user.

34. The method of claim 1, wherein a small pause occurs between the presentation of the first audio indicator and the second audio indicator.

35. The method of claim 6, wherein a small pause occurs between the presentation of the primary prompt and the secondary prompt.

36. The apparatus of claim 8, wherein a small pause occurs between the presentation of the first audio prompt and the second audio prompt.

37. The computer program product of claim 18, wherein a small pause occurs between the presentation of the primary prompt and the secondary prompt.

38. The voice response system of claim 21, wherein a small pause occurs between the presentation of the first audio prompt and the second audio prompt.

* * * * *

UNITED STATES PATENT AND TRADEMARK OFFICE
CERTIFICATE OF CORRECTION

PATENT NO. : 7,573,986 B2 Page 1 of 1
APPLICATION NO. : 09/908377
DATED : August 11, 2009
INVENTOR(S) : Balentine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 235 days.

Signed and Sealed this

Seventh Day of September, 2010

David J. Kappos
*Director of the United States Patent and Trademark Office*